A. E. LYMAN.
Weeding Hoe.
No. 83,866.  Patented Nov. 10, 1868.
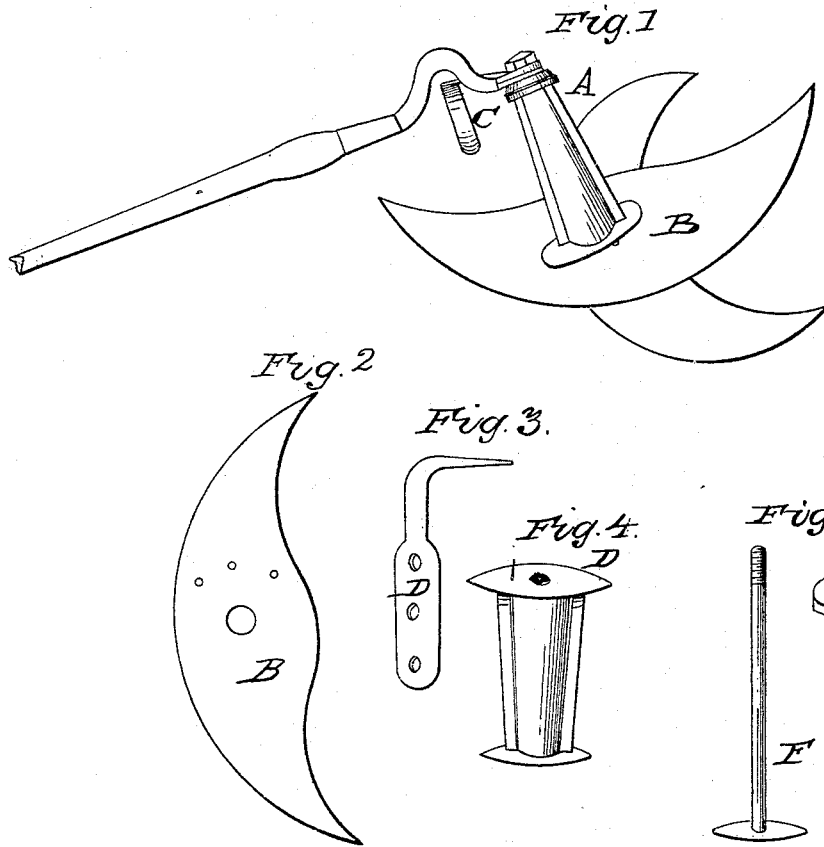

ALFRED E. LYMAN, OF NORTHAMPTON, MASSACHUSETTS.

Letters Patent No. 83,866, dated November 10, 1868.

IMPROVEMENT IN WEEDING-HOE.

The Schedule referred to in these Letters Patent and making part of the same.

*To all whom it may concern:*

Be it known that I, ALFRED E. LYMAN, of Northampton, in the county of Hampshire, and State of Massachusetts, have invented a new and improved Weeding-Hoe or Weed-Cutter; and I do hereby declare that the following is a full and exact description of the same.

The nature of my invention consists in constructing a weeding-hoe or weed-cutter in such a manner as to enable the operator to perform the required labor therefor with much greater ease and rapidity than in the usual mode or manner of those now in common use.

I will proceed to describe its construction and operation.

To enable others skilled in the business to make and use my invention, I proceed to describe its construction and operation, reference being had to the drawings hereunto annexed, and making part of this specification, in which—

Figure 1 is a perspective view.
Figure 2 is a blade or cutter.
Figure 3 is an indicator.
Figure 4, an eccentric-shaped socket-standard.
Figure 5 is a bolt with a thin oval head.
Figure 6 is an eccentric-shaped collar.
Figure 7 is a smaller one.

The same letters refer to the same things in all the figures.

Letter A or F' represents the weeding-hoe or weed-cutter, with the several parts connected together ready for use.

B, the blade or knife.
C, the adjustable indicator.
D, the eccentric-socket standard and support of the knives, shank, and collars.
F, bolt or fastening.
G, the eccentric-collar.
H, the smaller eccentric-collar.

The purpose of this construction of a weeding-hoe or weed-cutter is formed in such a manner as to enable the operator to perform the requisite labor for weeding-purposes much easier and with greater rapidity than heretofore by the use of those kinds in common use, or those of the latest date known.

In the knife or cutter B, which is formed of suitable metal, of a circular or straight knife with a hole in the centre, through which the bolt F passes, through allowing the blade or knife to expand or contract at pleasure, adapting itself to the width of the rows of plants while weeding the same, while the knife or blade is made firm both by the bolt F and the pin, as seen in D, each passing through the blades, and when properly adjusted is held firmly and prevented from turning around by the pin, as seen in D, on the largest end of the same, and on which is a collar, with the pin to which the blades or tines are fastened. The part between the collars in D is intended in part as a standard with pointed edges, so as to cut the earth, or assist in the same, while on each end is a collar, the larger one holding the knives or cutters while the top or smaller end is made to hold the shank and handle, as seen in fig. 1, together with the eccentric-collars G, the bolt F passing through the same, holding the said several parts firmly together, including the adjustable indicator C, which is held by the same bolt F, and is intended to indicate where the knife or blades are cutting, when in use, while under the surface of the ground, to prevent cutting the roots of the plants.

The eccentric-collar, as seen in G, is intended, by turning around on bolt F to any desirable position, to graduate the cutting-part B, lowering or raising the points at pleasure to take a lesser or deeper hold of the ground or earth while using the same, and combining and adjusting the several parts together, as is herein described, will form an implement for weeding-purposes much superior to those now in use, while it cuts, on the shearing-principle, in all directions, and is readily adjusted to the different required width of the ground to be cultivated or cut over, thereby saving much time and labor.

What I claim as my invention, and desire to secure by Letters Patent, is—

The graduating expansive weeding-hoe, (or weed-cutter,) as substantially described and herein set forth.

ALFRED E. LYMAN.

Witnesses:
SAMUEL W. SABIN,
CHAS. B. POLLARD.